(No Model.) 2 Sheets—Sheet 1.
M. STOLTERFOHT.
CLUTCH.
No. 321,656. Patented July 7, 1885.
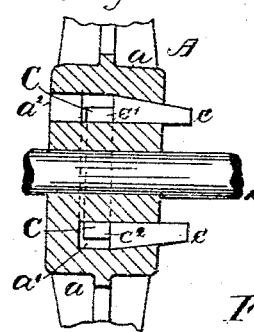
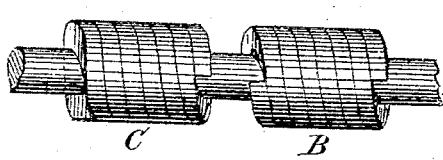
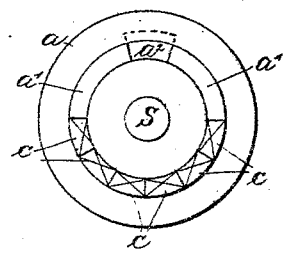
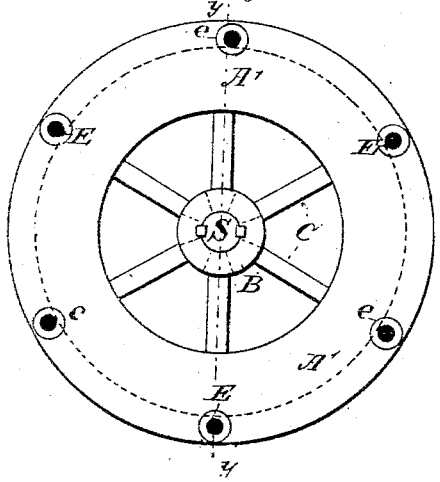
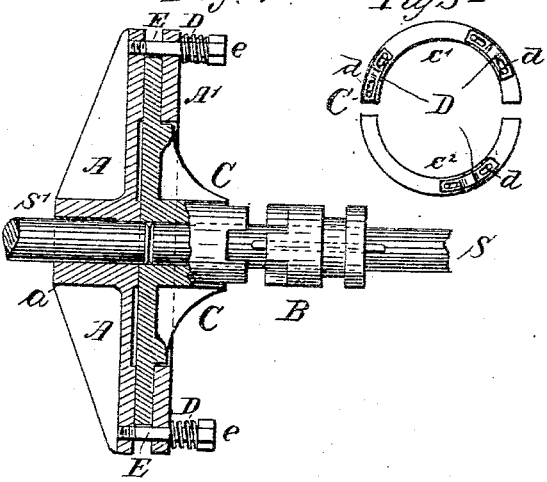
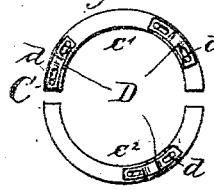
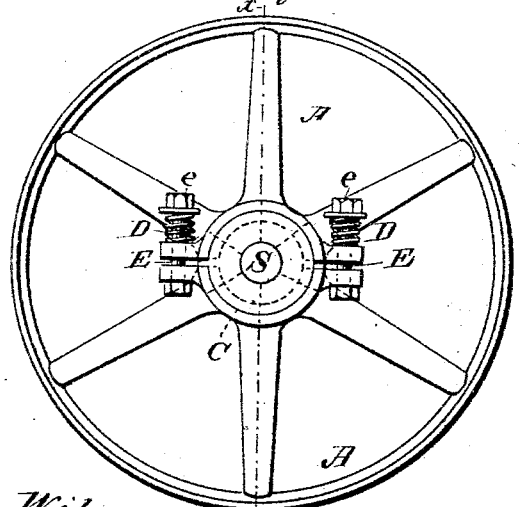
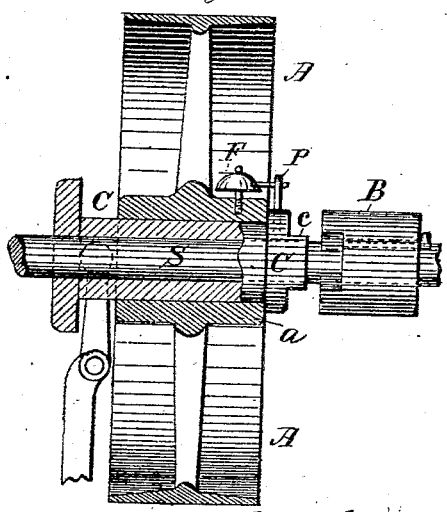
Witnesses.
Inventor
Max Stolterfoht

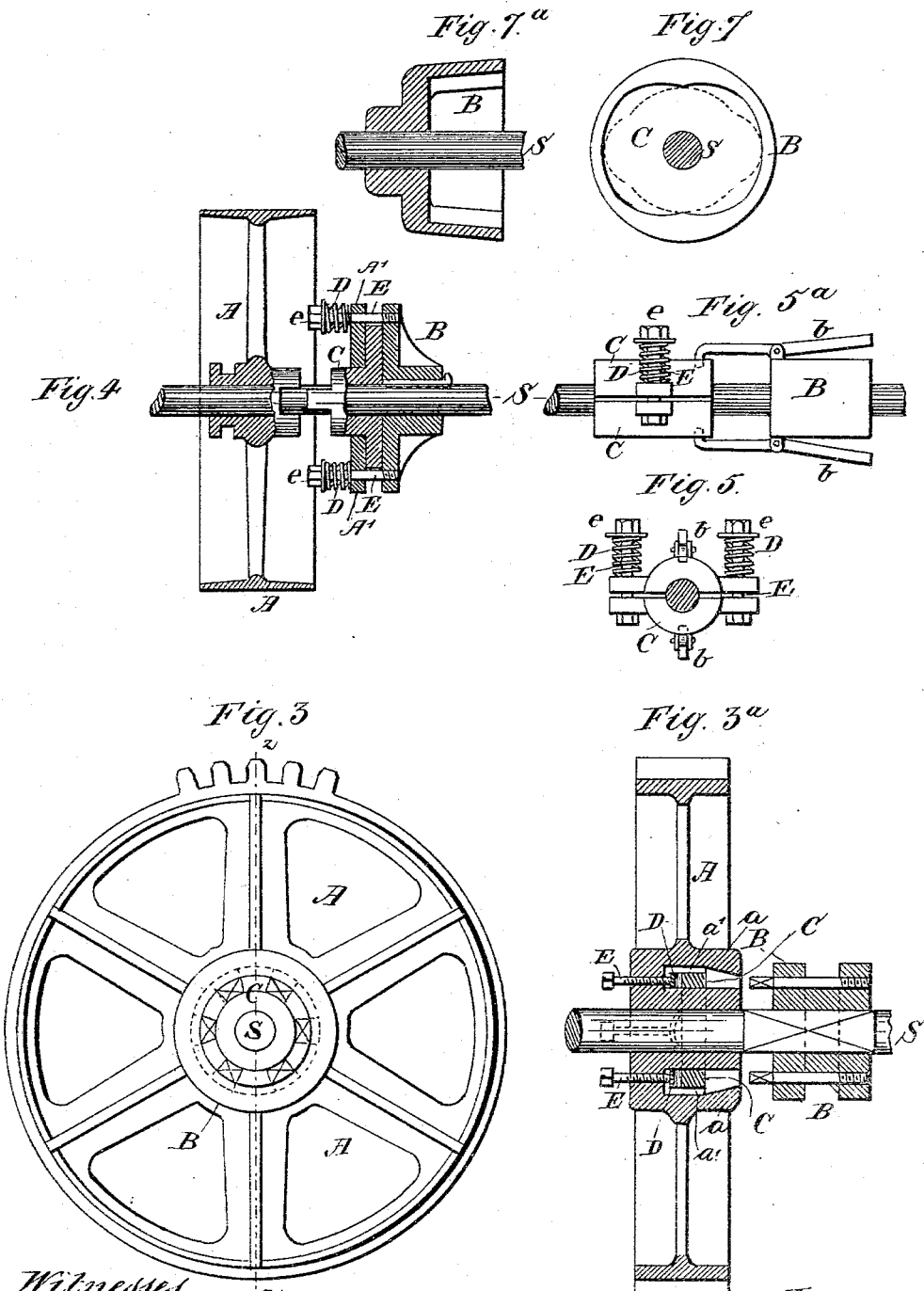

UNITED STATES PATENT OFFICE.

MAX STOLTERFOHT, OF BERLIN, GERMANY.

CLUTCH.

SPECIFICATION forming part of Letters Patent No. 321,656, dated July 7, 1885.

Application filed April 5, 1884. (No model.) Patented in Belgium March 18, 1884, No. 64,548; in France March 18, 1884, No. 161,014; in England March 18, 1884, No. 5,090; in Germany March 19, 1884, No. 28,471, and in Austria-Hungary September 25, 1884, No. 10,964 and No. 43,934.

*To all whom it may concern:*

Be it known that I, MAX STOLTERFOHT, a subject of the King of Prussia, residing at Berlin, Prussia, German Empire, have invented certain new and useful Improvements in Clutches; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The principle of operation in all friction-couplings as heretofore constructed is based upon a variable friction of the surfaces brought into contact. For example, this frictional contact of the driving-surface with the driven surface is nil at the moment the contact is made, and increases rapidly until it has attained sufficient power to cause the driven surface to be carried along with and by the driving-surface. From the instant the two surfaces are brought in contact to the instant said surfaces move in unison and at the same rate of speed there is an irregular motion of the driven surface, which motion of the driven surface increases in proportion to the increase of the frictional contact between the two surfaces until the latter move in unison and at the same rate of speed. The excess of power required to bring the two bodies to the point of joint uniform motion is here converted into heat, and, consequently, such power is not only lost but acts detrimentally upon the contacting surfaces, resulting in a rapid wear thereof.

The invention has for its object to overcome the above difficulties by maintaining the frictional contact between the surfaces constant, whether said surfaces are at rest or in motion.

The invention consists in providing means for regulating the degree of friction between the surfaces, and in combining a clutch-coupling with a friction-coupling.

The invention further consists in the mode of ascertaining whether the pressure exerted upon each other by the contacting surfaces is properly adjusted to avoid the loss of power and its conversion into heat, as above set forth; and, Lastly, the invention consists in certain details of construction.

The objects of this invention may be attained by variously constructed and arranged mechanical devices, and in the accompanying drawings I have illustrated several such arrangements applied under various conditions of use.

Figures 1, 2, and 3 are face elevations of several arrangements of combined friction and clutch couplings. Figs. 1ª, 2ª, and 3ª are sectional elevations of the same taken on lines $x\,x$, $y\,y$, and $z\,z$ of Figs. 1, 2, and 3, respectively. Fig. 3ᵇ is a face elevation of the hub of the wheel. (Shown in Figs. 3 and 3ª.) Fig. 3ᶜ is a section thereof, and Fig. 3ᵈ is a rear elevation of the friction-ring. Fig. 4 is a similar view of a modified form of the coupling shown in Figs. 2 and 2ª. Figs. 5 and 5ª are a face and a side elevation, respectively. Fig. 6 shows a form of elastic friction-coupling. Figs. 7 and 7ª are face and side elevations of a form of coupling for devices to which is imparted a reciprocating motion on a shaft.

In all these figures of drawings like letters indicate like parts wherever such may occur.

In carrying out my invention either the element driven or the driving element may be moved by frictional contact, the degree of friction between the contacting surfaces being constant whether said elements are at rest or in motion.

Broadly, the invention consists in mounting either the driven element or the driving element on, or otherwise connecting therewith, a friction device to impart motion by frictional contact to said element when locked to the driving-shaft by the usual clutch mechanism. The friction and clutch coupling is composed of a body, A, that constitutes one element of the coupling, a body, B, that constitutes the other element of the coupling, and a friction device, C. The latter device may be of various forms and materials, and may be applied to either the body A or the body B. The latter bodies may constitute the driven element or the driving element, and they may be mounted upon a driving-shaft or upon such a shaft and a driven shaft for the purposes of transmitting motion from the former to the latter shaft.

In Figs. 1 and 1ª the body A consists of a belt-pulley, the body B of the usual coupling-sleeve, and the body C of a friction-sleeve. The latter is loosely mounted on the driving-shaft S and carries the pulley. One of the faces of the sleeve C is provided with clutch-teeth $c$, adapted to engage the corresponding teeth of an ordinary coupling-sleeve, B, keyed to said shaft. The degree of friction between the sleeve C and the frictional surface of the inner periphery of the hub $a$ of the pulley A is regulated by means of the springs D mounted on bolts E, which latter pass through ears formed on the hub of the pulley.

It is obvious that by means of the nuts $e$ on bolts E the tension of the springs D, and consequently the degree of friction between the sleeve C and the hub $a$ of pulley A may be regulated, and when once adjusted it will remain practically constant, whether the pulley is at rest or in motion. It is also obvious that if the friction between the sleeve and the hub of the pulley is adjusted so as to cause the pulley to move with the sleeve, there is but little or no sliding movement of the latter within the hub of the former when said sleeve is brought into engagement with the coupling-sleeve B. In this manner I am enabled to reduce the sliding motion to a minimum and avoid the tendency to retard the rotation of the shaft, effect a saving of power, and avoid the wear of the surfaces in frictional contact.

In order to readily ascertain whether the friction between the contacting surfaces of the sleeve C and hub $a$ is properly adjusted, so that no undue sliding movement of one of said surfaces within the other can take place, I employ devices whereby this is made audible. The hub $a$ of the pulley A may, for instance, be provided with a bell, F, or a resonant spring, or other device capable of emitting sound, while the friction-sleeve C is provided with a hammer or striker-pin, P, which, when the sleeve C rotates within the hub $a$, will strike upon the bell or other device and produce an audible sound. When the coupling-sleeve C is brought into engagement with the corresponding sleeve, B, the former will rotate within the hub $a$ of pulley A, until the frictional resistance between said hub and sleeve is sufficient to carry the pulley along with the sleeve. During this rotation of sleeve C in hub $a$ the striker P strikes on the bell F a greater or less number of times, according to the number of revolutions of sleeve C within the hub $a$, before the latter rotates in unison with the sleeve. The number of contacts between the striker and bell will indicate whether the coupling is in proper condition, whether it requires lubrication, or whether the resistance during the operation exceeds the normal resistance, how often, how long, and to what extent the coupling becomes heated, and whether the function of the parts may be continued without fear of undue heating of the frictional surfaces, or whether their function should be stopped.

In Figs. 2 and 2ª I have illustrated the invention in its application for transmitting the motion of one shaft to an adjacent shaft, or a belt-pulley, or other driven device on said shaft, in this construction the friction device C, composed of a friction-disk loosely mounted on the driving-shaft S, and in frictional contact with the body A, which is here also composed of a friction disk rigidly keyed to the driven shaft S'. The frictional contact between the bodies A C is maintained and adjusted by means of disk-washer A', and the springs D, and the nuts $e$, on bolts E, which latter pass through the body A and disk A', the friction device C being of sufficiently less diameter for the purpose. Any desired number of bolts and springs may be employed to effect this adjustment. The hub of the friction device C is provided on its face with clutch-teeth $c$, adapted to engage the teeth of the body B, which here also constitutes the ordinary sliding coupling-sleeve on the driving-shaft S. It is obvious that this order may be reversed, and that S' may be the driving-shaft, and S the driven shaft, without changing the respective arrangement of the several parts that constitute the coupling.

In Figs. 3 and 3ª the body A is represented by a cog-wheel loosely mounted on the driving-shaft, and the hub thereof is provided with an annular recess, $a'$, that is conical in section or tapering outwardly, in which is fitted the friction device C. This friction device is composed of a friction-ring made in two sections, $c'$ $c^2$, bearing against clutch-teeth $c$, the degree of friction being regulated by means of springs D and bolts E.

As shown in Figs. 3ª, 3ᵇ, and 3ᶜ the hub $a$ has an annular recess or chamber, $a'$, the front portion of which is conical in section for the reception of clutch-teeth $c$ of corresponding form. Upon the ring C are secured pressure-regulating springs D, which in this case are bent or semi-elliptic springs, the ends of which are slotted and secured to the ring by means of screw-bolts $d$, that pass through the slots of said springs, the arrangement being such as to allow the springs to be compressed by the set-bolts E, or expand when released from the pressure of the bolts, the free ends of said springs sliding on the set-bolts $d$. These teeth and the friction-ring C are inserted and adjusted as follows: In its rear face the hub $a$ of the wheel A has an opening, $a^2$, of such form and size as to admit of the insertion of the clutch-teeth $c$, one at a time, six of such teeth being employed, which so inserted will occupy a space equal to nearly one-half of the circle described by the annular recess, as shown in Fig. 3ᵇ, thus leaving room for the insertion from the front of the hub of the two halves c′ c² of the friction-ring C, which, when inserted and turned in proper position, can then be made to bear against the rear faces of the teeth, which latter, when the ring is inserted, are adjusted to position or spaced so as to engage the teeth of the coupling-sleeve B, as shown in Figs. 3, 3ᵃ, and 3ᶜ. The degree of friction between the ring and clutch-teeth may then be regulated by means of the bolts E. As shown, the coupling-sleeve is fitted and adapted to slide upon a squared portion of the driving-shaft S, though it may be keyed thereto, as above set forth.

As shown in Fig. 4, the friction device is applied to the body B, which constitutes the coupling-sleeve, instead of being applied to the body A, as in Figs. 1, 1ᵃ, 2, 2ᵃ, 3, and 3ᵃ, the arrangement being similar to that shown in Figs. 2 and 2ᵃ, the friction-disk C being applied to the face of a flange formed on the body or coupling-sleeve B, and the degree of friction between said disk C and the flange of the sleeve B is regulated by means of the disk-washer A′, the bolts E, nuts e, and springs D, as described in respect of Figs. 2 and 2ᵃ. This arrangement shows a simple means of the application of the combined clutch and friction coupling to existing belt-pulleys.

In Figs. 5 and 5ᵃ I have shown a coupling for reciprocating shafts, the driving-shaft S having a reciprocating motion imparted thereto in any usual manner, which reciprocating movement is transmitted to the driven shaft S′ by means of the coupling referred to, the body B, which here also constitutes a coupling-sleeve, being provided with pivoted locking-levers b, adapted to engage the friction device C, composed of a two-part friction-sleeve mounted directly on the driven shaft S′, the degree of friction between it and said shaft being regulated by means of the springs D, the bolts E, and nuts e, as above set forth.

It is obvious that the arrangement and construction of the pressure-regulating springs D may be varied, and that springs made of an elastic metal or any other elastic material may be employed—as, for instance, rubber, leather, paper, or other analogous elastic material—and instead of applying the regulating power to the friction device to regulate the pressure between it and the part mounted thereon and connected therewith, the friction device itself may be made of an elastic material. It is further obvious that any suitable form of clutch-teeth may be employed.

In Fig. 6 I have shown a friction device, C, and a coupling-sleeve, B, both composed of a spring, the former loosely coiled upon and the latter keyed to the shaft S, the ends of which springs form clutch-teeth. In this arrangement the elasticity of the spring determines the degree of friction between it and the part mounted thereon when the two bodies C and B are brought in engagement.

In Figs. 7 and 7ᵃ I have illustrated another form of clutch-teeth, the bodies B and C being conical in section and adapted to fit one into the other, while the engaging surfaces of their teeth are formed at an angle of five degrees to fifty degrees to the direction of rotation, and in this, as well as in the arrangement shown in Fig. 6, a portion of the applied power is converted by friction into heat, and the other portion is taken up by the elasticity of the body C, the tension of which is practically uniform. This arrangement of clutch-teeth I prefer as being the most effective, and permitting the coupling of the parts in whatever direction the shaft may rotate.

From what has been said it will be seen that the degree of friction between the friction device C and the body A or B may be readily adjusted, and when adjusted will remain practically constant. It will also be seen that the frictional contact between said parts is a yielding or elastic one that serves to counteract the shocks when the coupling is effected, the springs or the elastic frictional device acting in a measure like a buffer.

Having now described my invention, what I claim, and desire to secure by Letters Patent of the United States, is—

1. In two-part couplings for transmitting motion, in which one of the sections of the coupling is adapted to slide on its shaft into or out of engagement with the other section, the combination of a friction device, the frictional resistance of which is uniform and constant either when the sections are coupled or uncoupled, for the purpose specified.

2. In two-part couplings for transmitting motion, in which one of the sections of the coupling is adapted to slide on its shaft into or out of engagement with the other section, the combination of a friction device, the frictional resistance of which is uniform and constant but yielding either when the sections are coupled or uncoupled, for the purpose specified.

3. In two-part couplings for transmitting motion, in which one of the sections of the coupling is adapted to slide on its shaft into or out of engagement with the other section, the combination of a friction device and adjusting mechanism for varying the frictional resistance thereof, and maintaining said resistance uniform and constant whether the sections are coupled or uncoupled, for the purpose specified.

4. In two-part couplings for transmitting motion, in which one of the sections of the coupling is adapted to slide on its shaft into or out of engagement with the other section, the combination of a friction device and adjusting mechanism for varying the frictional resistance thereof maintaining said resistance uniform and constant but yielding, for the purpose specified.

5. In couplings for transmitting rotary or reciprocating motion, the combination, with the driving or the driven section of the coupling, of a friction device for taking up the frictional resistance exerted in coupling, and a signal controlled by said friction device, for the purpose specified.

In testimony whereof I affix my signature in presence of two witnesses.

MAX STOLTERFOHT.

Witnesses:
A. DEMELIUS,
B. ROI.